United States Patent [19]
Wright et al.

[11] Patent Number: 5,169,090
[45] Date of Patent: Dec. 8, 1992

[54] ATTITUDE SYNCHRONIZATION FOR MODEL FOLLOWING CONTROL SYSTEMS

[75] Inventors: Stuart C. Wright, Woodbridge; Joseph P. Skonieczny, Madison; Phillip J. Gold, Shelton, all of Conn.; James B. Dryfoos, Wallingford, Pa.

[73] Assignee: United Technologies Corporation, Hartford, Conn.

[21] Appl. No.: 751,429

[22] Filed: Aug. 28, 1991

[51] Int. Cl.$^5$ .............................................. B64C 11/44
[52] U.S. Cl. .................................. 244/17.13; 244/175; 244/76 R; 364/434
[58] Field of Search .................... 244/17.13, 175, 177, 244/181, 183, 180, 191, 193, 76 R; 364/432, 433, 434

[56] References Cited

U.S. PATENT DOCUMENTS

| | | | |
|---|---|---|---|
| 3,057,584 | 10/1962 | Bretoi | 244/193 |
| 3,571,578 | 5/1971 | Fry | 364/434 |
| 3,711,042 | 1/1973 | Rempfer et al. | 244/17.13 |
| 3,848,172 | 11/1974 | Thomas | 244/177 |
| 4,129,275 | 12/1978 | Gerstine et al. | 364/434 |
| 4,245,465 | 3/1981 | Land | 244/175 |
| 4,312,039 | 1/1982 | Skutecki | 244/17.13 |
| 4,383,299 | 5/1983 | Fischer et al. | 364/434 |
| 4,385,356 | 5/1983 | Verzella et al. | 364/434 |
| 4,477,876 | 10/1984 | Wright et al. | 364/434 |
| 4,645,141 | 2/1987 | McElreath | 364/432 |
| 5,062,583 | 11/1991 | Lipps et al. | 364/435 |

Primary Examiner—Joseph F. Peters, Jr.
Assistant Examiner—Virna Lissi Mojica
Attorney, Agent, or Firm—Patrick J. O'Shea

[57] ABSTRACT

A helicopter flight control system includes a model following control system architecture having provisions to compensate for Euler singularities which occur when the pitch attitude of the helicopter starts to approach ninety degrees. The control system processes information from a variety of helicopter sensors in order to provide the control commands to the helicopter main and tail rotors. The present invention synchronizes a sensed attitude signal, and a desired attitude signal as the pitch attitude of the helicopter approaches ninety degrees to compensate for the Euler singularities.

12 Claims, 8 Drawing Sheets

ATTITUDE SYNCHRONIZATION FOR MODEL FOLLOWING CONTROL SYSTEMS

The Government has rights in this invention pursuant to a contract awarded by the Department of the Army.

DESCRIPTION

1. Technical Field

This invention relates to aircraft flight control systems, and more particularly to model following flight control systems.

2. Background Art

In an aircraft flight control system employing model following control laws, aircraft coordinates measured around the pitch, roll and yaw axes of the aircraft are transformed into inertial referenced coordinates. The pitch angle and roll attitude of the aircraft are used in the transform.

The transform, however, is bounded. When the pitch attitude (hereinafter THETA) approaches 90°, cosine THETA approaches zero. In a model following control system which must calculate the value of 1/cos(THETA) and tan(THETA), the quantity goes to infinity as THETA approaches 90 degrees, resulting in Euler singularities. In addition, the measured heading and roll attitudes flip 180° and the pitch attitude heads back towards 0° rather than increasing beyond 90°.

Earlier generation helicopters were not aerodynamically capable of approaching such attitudes and as a result the model following flight control systems for these aircraft did not have to take into account these singularities. However, with the advent of a new generation of highly maneuverable attack helicopter (the Comanche RAH-66 helicopter), flight control system operation must insure that operation about these singularities does not result in a control discontinuity.

DISCLOSURE OF THE INVENTION

One object of the present invention is to provide a model following flight control system whose control performance is immune to the occurrence of Euler singularities during aircraft flight maneuvers.

Another object of the present invention is to provide a model following flight control system in which the attitude models track their applicable actual sensed attitude so the error between the model set point values and actual sensed values are minimum when the aircraft operates at high pitch angles.

According to the present invention a model following flight control system includes rate of change, command model algorithms for the aircraft's pitch, roll, and yaw axis rates of change; the flight control system receiving pilot command input signals from a sidearm controller so as to schedule the actual command rate of change in each aircraft axis as a function of the corresponding model axis set point, to provide the summed signal output of each axis model as a desired command signal which controls the aircraft response about the pitch, roll and yaw axes in dependence on the model set point for each axis.

The present invention synchronizes the attitude models for the pitch, roll and yaw axes while the aircraft transitions through the Euler singularities at ±90° pitch attitude. Synchronization is performed by feeding back the attitude error around the attitude model, and inputting the attitude error signal into the attitude model such that the attitude model tracks the sensed attitude value at high pitch attitudes. This prevents large errors from accumulating in each axis between the attitude model and the sensed attitude while operating at high pitch attitudes. Once pitch attitude is reduced, attitude model synchronization is disengaged.

The advantage of the present invention is that as the aircraft reduces its pitch from an attitude about which a singularity may occur, large errors will not have built up between the attitude models and the actual attitude of the aircraft. This ensures the model is not lagging the aircraft by an unacceptable amount, allowing for a more robust aircraft response as pitch attitude is reduced.

These and other objects, features and advantages of the present invention will become more apparent in light of the following detailed description of a best mode embodiment thereof as illustrated in the accompanying drawings.

BEST MODE FOR CARRYING OUT THE INVENTION

Figure 8:
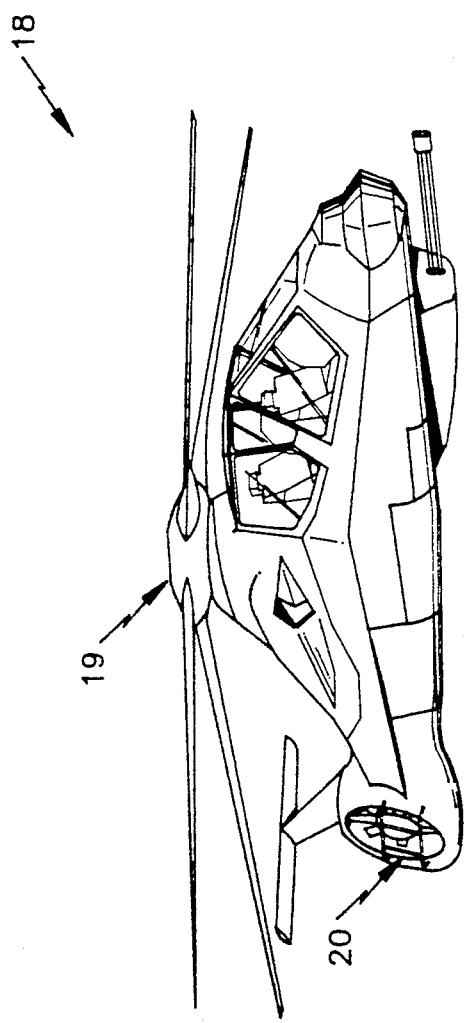
FIG. 8 is a pictorial illustration of an aircraft in which the flight control system embodiment of FIG. 1 may be used.

Referring first to FIG. 8, which is a pictorial illustration of a helicopter embodiment 18 of a rotary wing aircraft in which the present invention may be used. The helicopter includes a main rotor assembly 19 and tail rotor assembly 20.

Figure 1:
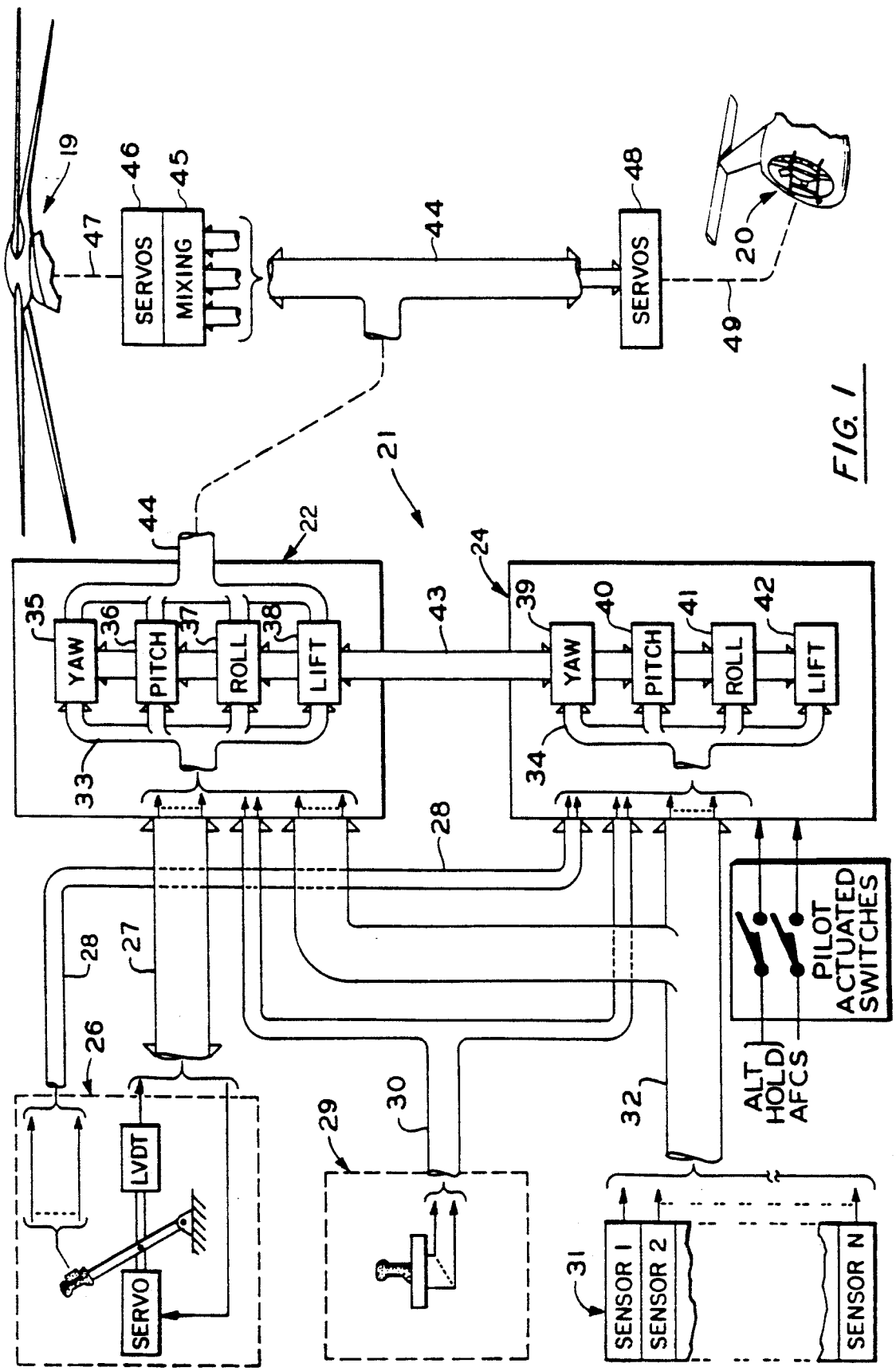
FIG. 1 is a functional block diagram of an aircraft flight control system having a Primary Flight Control System (PFCS) and an Automatic Flight Control System (AFCS)

Referring now to FIG. 1, the helicopter flight control system of the present invention 21 is a model following control system which shapes the pilot's sidearm controller and displacement stick commands through an "inverse vehicle model" to produce a desired aircraft response. The system includes a Primary Flight Control System (PFCS) 22 and an Automatic Flight Control System (AFCS) 24. The PFCS receives displacement command output signals from a displacement collective stick 26 on line 27 and the AFCS receives the collective stick discrete output signals on a line 28. The PFCS and AFCS each receive the force output command signals of a four axis sidearm controller 29, on lines 30, and the aircraft's sensed parameter signals from sensors 31, on lines 32. The pilot command signals on lines 27, 28, and 30 and the sensed parameter signals on lines 32 are shown consolidated within trunk lines 33 and 34 in the PFCS and AFCS, respectively.

The PFCS and AFCS each contain control channel logic for controlling the yaw, pitch, roll and lift axes of the aircraft. In FIG. 1 these logic modules are shown by blocks 35-38 for the PFCS and blocks 39-42 for the AFCS. The PFCS provides rotor command signals and the AFCS logic provides conditioning and/or trimming of the PFCS four axis logic functions. The PFCS and AFCS logic modules interconnect through bus 43.

As described in detail hereinafter, the PFCS and AFCS use a model following algorithm in each control axis to provide rotor command signals on output lines 44 to a main rotor mixing function 45 which commands displacement of mechanical servos 46 and linkages 47 to control the tip path plane of the main rotor 19. Rotor command signals are also provided on lines 44 to the helicopter's tail rotor servos 48 which control the thrust of the tail rotor 20 through linkages 49. The sensed parameter signals from sensors 31, on lines 32, provide the PFCS and AFCS with the aircraft's angular rate and attitude response to the rotor command signals.

Figure 2:
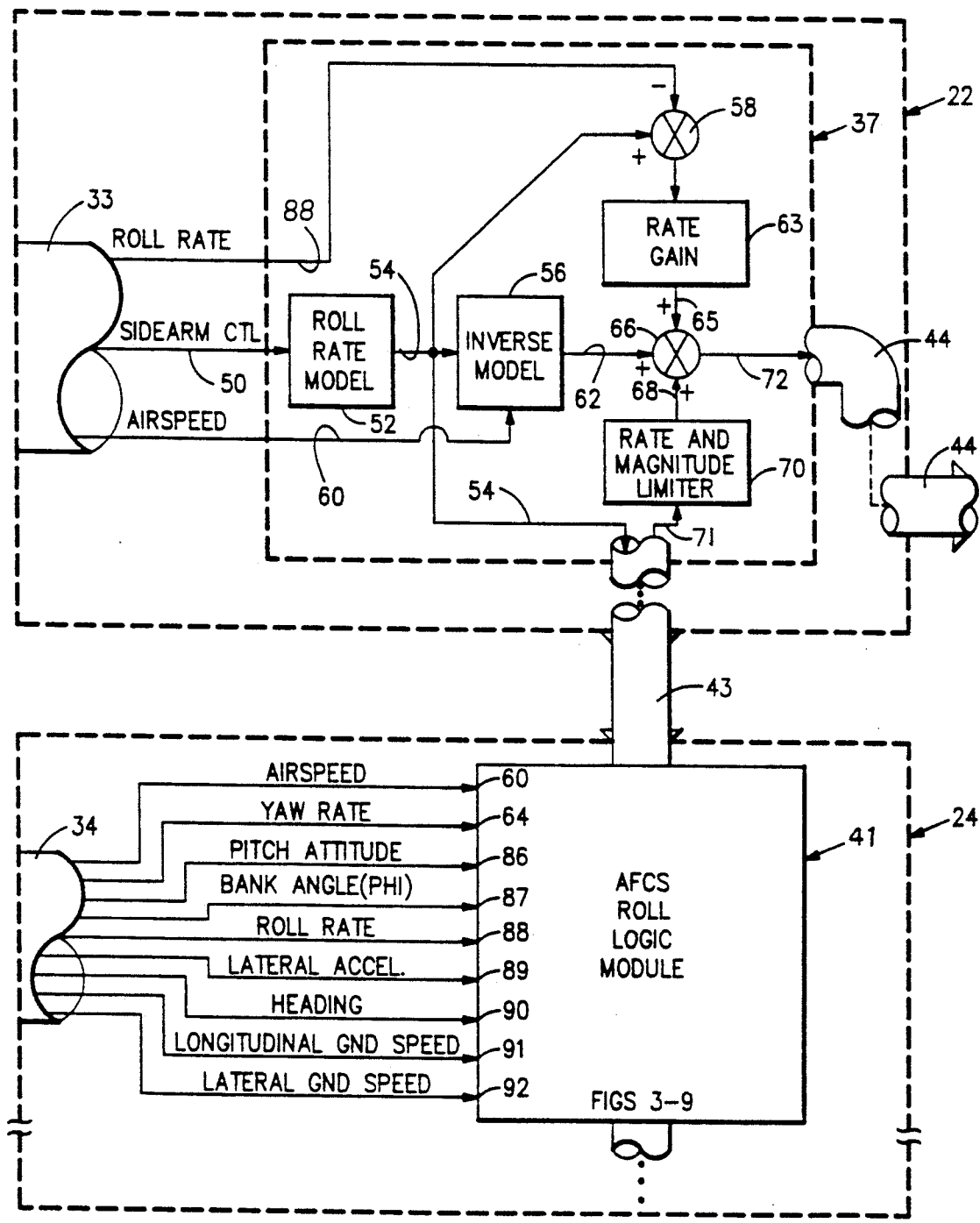
FIG. 2 is a block diagram of the aircraft roll axes control logic resident in the aircraft flight control system of FIG. 1.

FIG. 2 is a partial schematic section of FIG. 1, illustrating the functional interconnection of the PFCS 22 and AFCS 24 roll logic modules 37 and 41, respectfully. The PFCS roll logic module 37 receives a roll axis command signal on line 50, provided through trunk lines 33 and lines 30, from the sidearm controller 29 (FIG. 1). In the present embodiment the sidearm controller is a four axis force stick in which the roll axis command signal is generated by the pilot's imparting a lateral force on the the sidearm controller in the direction of the desired roll. The roll command signal is presented to the input of roll rate model circuitry 52 (e.g. a first order lag filter with selected radians/sec/volt signal gain) that provides a desired roll rate signal on a line 54 indicative of the desired rate of change for the aircraft attitude about the roll axis. Selection of the roll rate model is dependant on the dynamics of the aircraft and the roll response desired.

The desired roll rate signal on line 54 is presented simultaneously to: the input of a roll-axis vehicle inverse model 56, a summing function 58, and the bus 43 to the AFCS roll logic module 41. The inverse model 56 receives the aircraft's actual airspeed from sensors 31, through lines 32 and trunk 33, as a sensed airspeed signal on line 60. The inverse model 56 is a Z-model transform, which may be embodied as a first order lead filter with instantaneous voltage gain and time constant characteristics which vary with the magnitude of the sensed airspeed signal on line 60. The cascaded roll rate model 52 and inverse model 56 provide a feedforward path for the sidearm control signal on line 50.

The feedforward, inverse Z-model transform provides the primary control input to the main rotor assembly 19 (FIG. 1) which causes the helicopter 18 (FIG. 8) to roll at a rate set by a desired roll rate command signal on a line 62. This commanded roll rate signal represents the main rotor command necessary to achieve the desired roll-axis rate of change of the aircraft for each pilot commanded maneuver.

The summing function 58 sums the desired roll rate signal on line 54 (from the roll rate model 52) with the aircraft's actual roll rate, received (from sensors 31, through lines 32 and trunk 33) as a sensed roll rate signal on line 64, to provide a roll rate error signal on line 65. The rate error signal is amplified in a rate gain stage 64 and presented to one input of a second summing function 66. The function 66 also receives the desired roll rate command signal on line 62 from the inverse model 56, and a roll command modifying signal on a line 68 from a rate and magnitude limiter 70. The limiter 70, receives on a line 71 the nonlimited roll command modifying signal (through bus 43) from the AFCS roll logic module 41, and limits the magnitude and rate of change to provide the roll command modifying signal on the 68. The resulting sum signal is provided on the output line 72 of the PFCS roll logic module 37, and presented through the PFCS output trunk lines 44 to the main rotor servos (46, FIG. 1).

The magnitude and rate of change of the roll command modifying signal from the AFCS is a function of the aircraft bank angle error. The aircraft bank angle error is the second of two feedback loops around the main rotor command signal; the first being the roll rate error signal on line 65. As described in detail hereinafter, the roll command modifying signal is a calculated value provided by a model following algorithm within the AFCS, based on the actual aircraft response to the rotor command signal. The roll command modifying signal modifies the magnitude and rate of change of the main rotor command signal.

As shown in FIG. 2, in addition to the desired roll rate signal received from the PFCS roll logic module 37 on line 54 (through trunk 43), the AFCS roll logic module 41 receives the following sensed aircraft parameters through trunk line 34: actual airspeed (line 60), actual yaw rate (line 64), pitch attitude (line 86), bank angle (PHI) (line 87), roll rate (line 88), lateral acceleration (line 89), heading (line 90), longitudinal ground speed (line 91), and lateral ground speed (line 92). The best mode embodiment of the AFCS is as a microprocessor based electronic control system in which the algorithms of the AFCS logic modules (39–41, FIG. 1) reside in executable program listings stored in memory.

Figure 3:
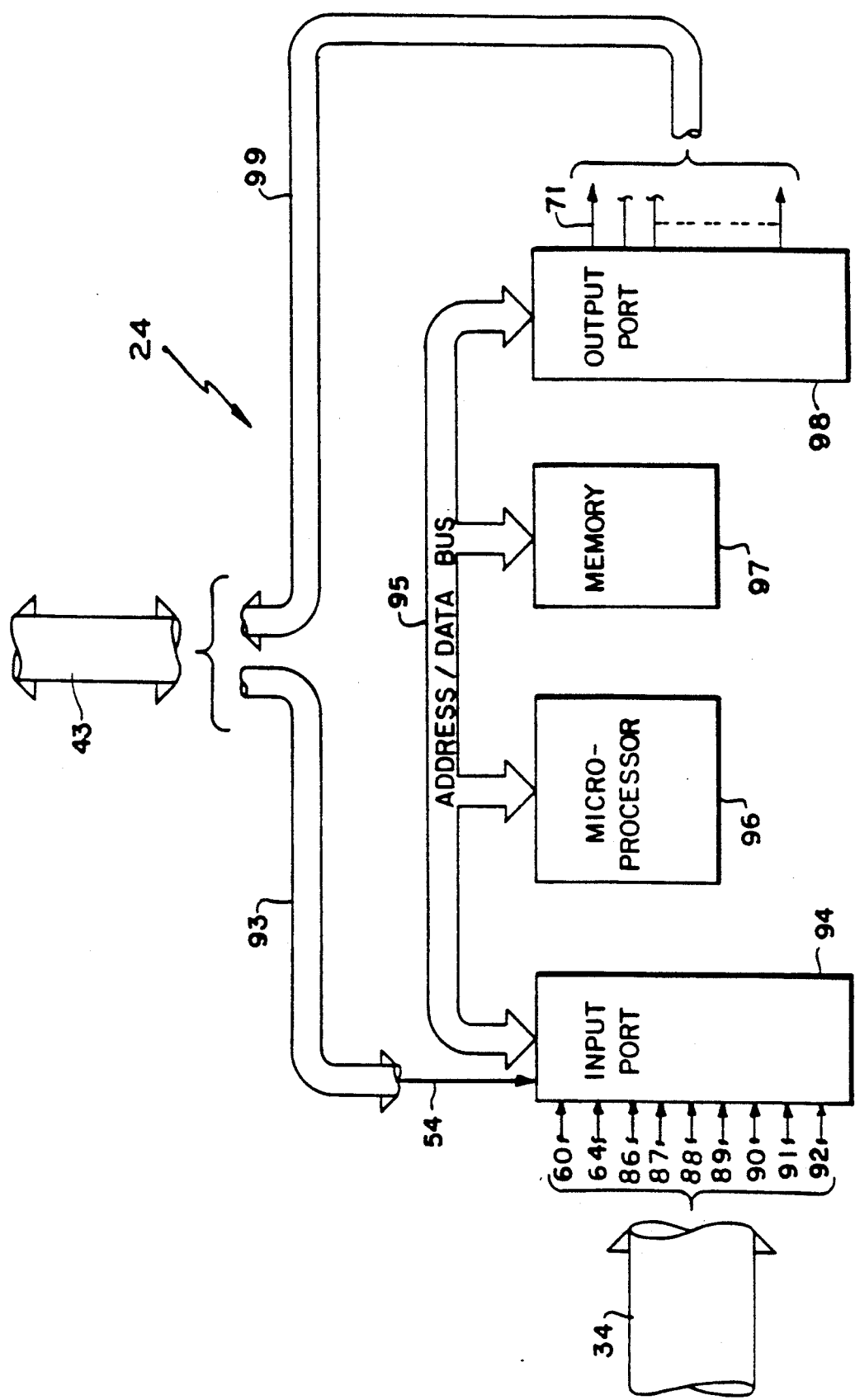
FIG. 3 is a block diagram illustration of the electronic hardware of the AFCS in FIG. 1.

FIG. 3, shows the architecture of a microprocessor based AFCS 24. The desired roll rate signal on line 54 is received from input lines 93 included within the lines 43 interconnecting the AFCS and PFCS. The sensed aircraft parameter signals on lines 60, 64, and 86–92 are received from the AFCS input trunk line 34, at an AFCS input port 94. Depending on the format of the input signals (analog or digital) the input port 94 which may include an analog-to-digital converter, a frequency-to-digital convertor, and any such other signal conditioning functions known to those skilled in the art as being required to transform the input signals to digital signal format.

The input port is connected through an address/data bus 95 to a microprocessor 96 (e.g., Intel 80286, Motorola 68020), memory means 97 (including RAM, UV-PROM, EEPROM), and an output port 98. The output port may comprise a digital-to-analog converter, a parallel-to-serial convertor, a discrete output driver, and any such other signal conversion functions known to those skilled in the art as being required to transform the AFCS digital signal format to that required by the control system (21, FIG. 1). The output port lines, including the line 71 to the PFCS roll logic module 37, are presented through lines 99 to the interconnecting lines 43.

Figure 4:
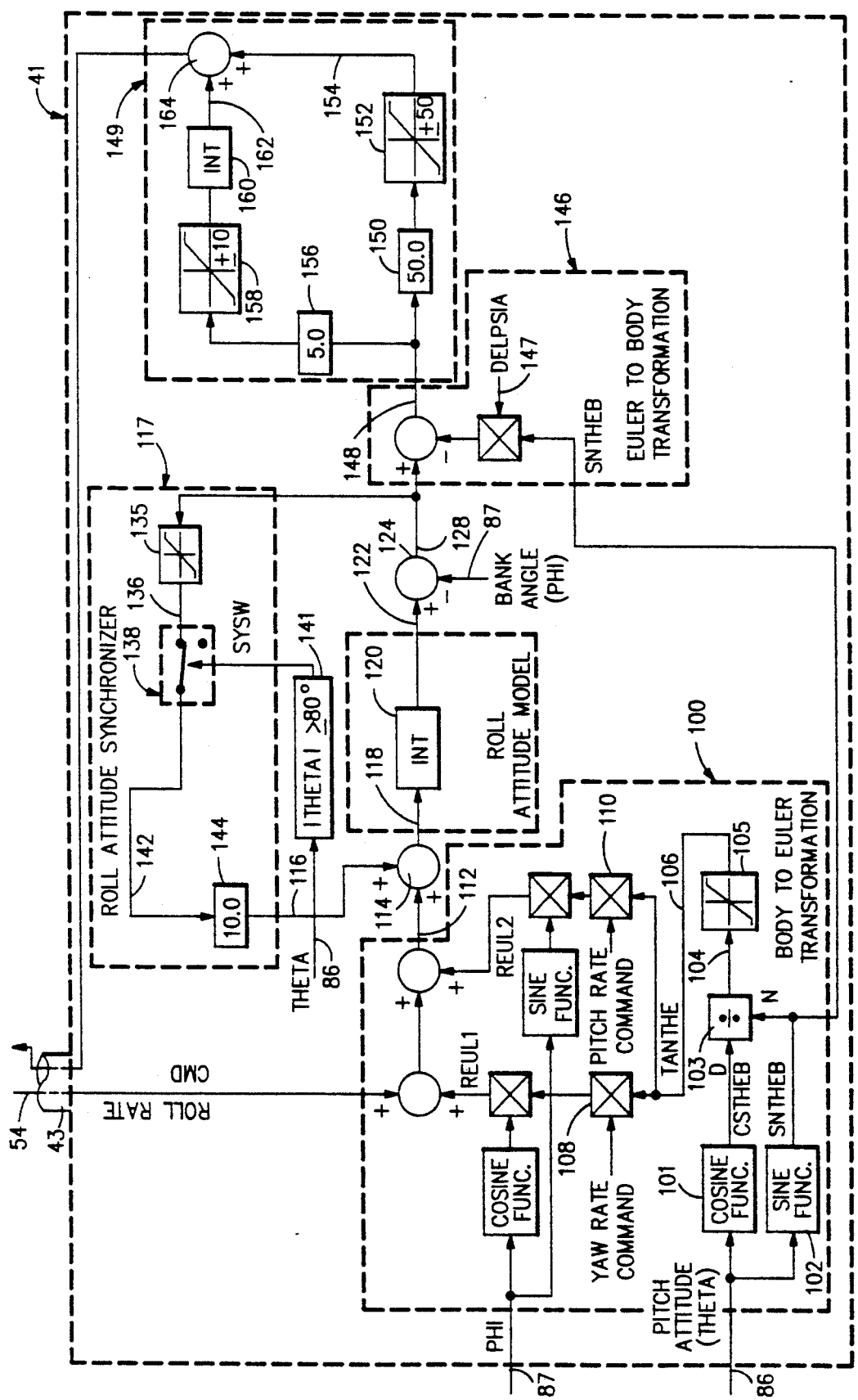
FIG. 4 is a block diagram of the aircraft roll axes control logic resident in the AFCS of FIG. 1.

FIG. 4 is a schematic illustration of the AFCS roll logic module 41 (FIG. 1), which is used in the description of operation of the model. The model's algorithm is contained in a software program listing stored in memory 97, which is executed in the microprocessor 96. The desired roll rate signal is input on the line 54 to a Body-to-Euler Transformation 100 which also receives the vehicle bank angle, PHI on the line 87, and the actual vehicle pitch attitude, THETA on the line 86.

The transformation 100 takes both the cosine and the sine of THETA using functions 101,102 respectively, and provides signals CSTHEB and SNTHEB respectively to a division function 103, where SNTHEB is the numerator term and CSTHEB is the denominator term. The division function 103 provides an output signal, indicative of the tangent of THETA, on a line 104 to a limiter 105 which provides a limited signal TANTHE on a line 106 to a first multiplier 108 and a second multiplier 110. The limiter 105 prevents TANTHE from going to infinity as THETA approaches ±90°. The yaw rate command signal from the PFCS yaw logic module 35, is also input to the first multiplier 108. Similarly the pitch rate command from the PFCS pitch logic module 36 is input to the second multiplier 110. The operation of the rest of the transform is self explanatory.

The yaw rate command signal input to the first multiplier 108 is produced by a yaw rate model, which schedules a desired yaw rate in response to a yaw command from the sidearm controller. The yaw rate model is disclosed in co-pending application Ser. No. 751431, entitled "High Speed Turn Coordination Logic for Rotary Winged Aircraft", filed on even dated herewith by Skonieczny et al, and is hereby incorporated by reference.

The transformation 100 provides an output signal on a line 112 to a summing function 114. The summing function 114 also receives a synchronize signal (i.e., a feedback signal) on a line 116 from a roll attitude synchronizer function 117, and provides a signal on a line 118 to a roll attitude model 120, which is typically an integrator. The roll attitude synchronizer will be discussed in detail hereinafter.

The roll attitude model integrates over time the signal on the line 118, and provides an output signal indicative of desired bank angle on a line 122 to a summing function 124. The summing function 124 also receives the actual bank angle signal PHI on a line 87, and provides a bank angle error signal on a line 128 which is indicative of the error between the actual and desired bank angle.

The roll attitude synchronizer 117 of the present invention receives the bank angle error signal, limits it with a limiter 135, and provides a signal on a line 136 to a switch 138 whose operation is controlled based upon the status of a discrete signal SYSW on a line 140. The state of SYSW is controlled by a comparison function 141 which receives the pitch attitude signal, THETA on the line 86. If |THETA| ≧ 80° is true, then SYSW is set (i.e., SYSW equals "1"), which closes the switch 138 and allows the signal on the line 136 to pass onto a line 142. Note: the switch is shown in the closed position If |THETA| ≧ 80° is false, then SYSW is cleared (i.e., SYSW equals "0") and the switch is placed in the open position, resulting in the signal on the line 142 being set equal to zero. The signal on the line 142 is multiplied by a gain 144 to provide the synchronize signal on the line 116.

Now follows an explanation of the theory of operation of the roll attitude synchronizer in avoiding the discontinuities created by the Euler singularities. When the magnitude of the aircraft pitch attitude THETA is less than 80°, the switch 138 is in the open position which disengages the attitude synchronizer 117. As the aircraft pitch attitude increases above 80°, the switch is closed by the comparison function 141 and the limited attitude error signal on the line 136 is passed through the switch into the gain 144 to provide feedback around the attitude model 120. The synchronize signal on the line 116 is input to the attitude model (e.g., an integrator) which acts to drive (i.e., forces it to track) the value of the desired bank angle signal on the line 122 towards the value of the bank angle signal, PHI on the line 87. In other words the error signal on the line 128 is driven to zero. As an example, if PHI is equal to 10° of bank, and the attitude model is providing a desired bank angle of 5° on the line 128, then the attitude synchronizer 117 will provide a signal equal to −50° on the line 116. This signal acts to reduce the signal on the line 118 to the rate model, such that, either the rate at which PHI and the desired bank angle are diverging is reduced, or the desired bank angle signal on the line 112 is driven towards the actual bank angle PHI. Forcing the roll attitude model to track the bank angle signal solves the hereinbefore described problems of the model diverging from the actual attitude, that is the actual bank angle. The value of the gain 144, dictates the time constant of the synchronizer, while the limits values in the limit function 135 dictates the rate limit of the attitude synchronizer 117.

Continuing the explanation of the logic in FIG. 4, the bank angle error signal on the line 128 is also input to a Euler to Body Transform 146 which transforms the error (which is normalized with respect to inertial axis), back to a basis which is normalized with respect to the helicopter axes. The body transform 146 uses the signal SNTHEB (indicative of the sine of THETA) from the sine function 102 in the Body-to-Euler Transformation 100. The other signal in the transform 146, DELPSIA, is the aircraft heading error signal from the AFCS yaw logic module 39 which is input on a line 147 contained in the bus 43 (FIG. 1). There are no singularities in the Euler-to-Body transform.

The Euler-to-Body transformation 146 provides a transformed bank angle error signal on a line 148 to a proportional and integral compensator 149. The compensator includes a gain function 150 and a limiter 152 which combine to provide a proportional path signal on a line 154. The compensator further includes an integral path having a gain 156, a limiter 158 and an integrator 160 with limits which provides an integral path signal on a line 162. The integral path and proportional path signals are summed by a summing function 164 to provide the roll command modifying signal on the line 71, which is a function of the roll attitude (i.e., bank angle) error.

Figure 5:
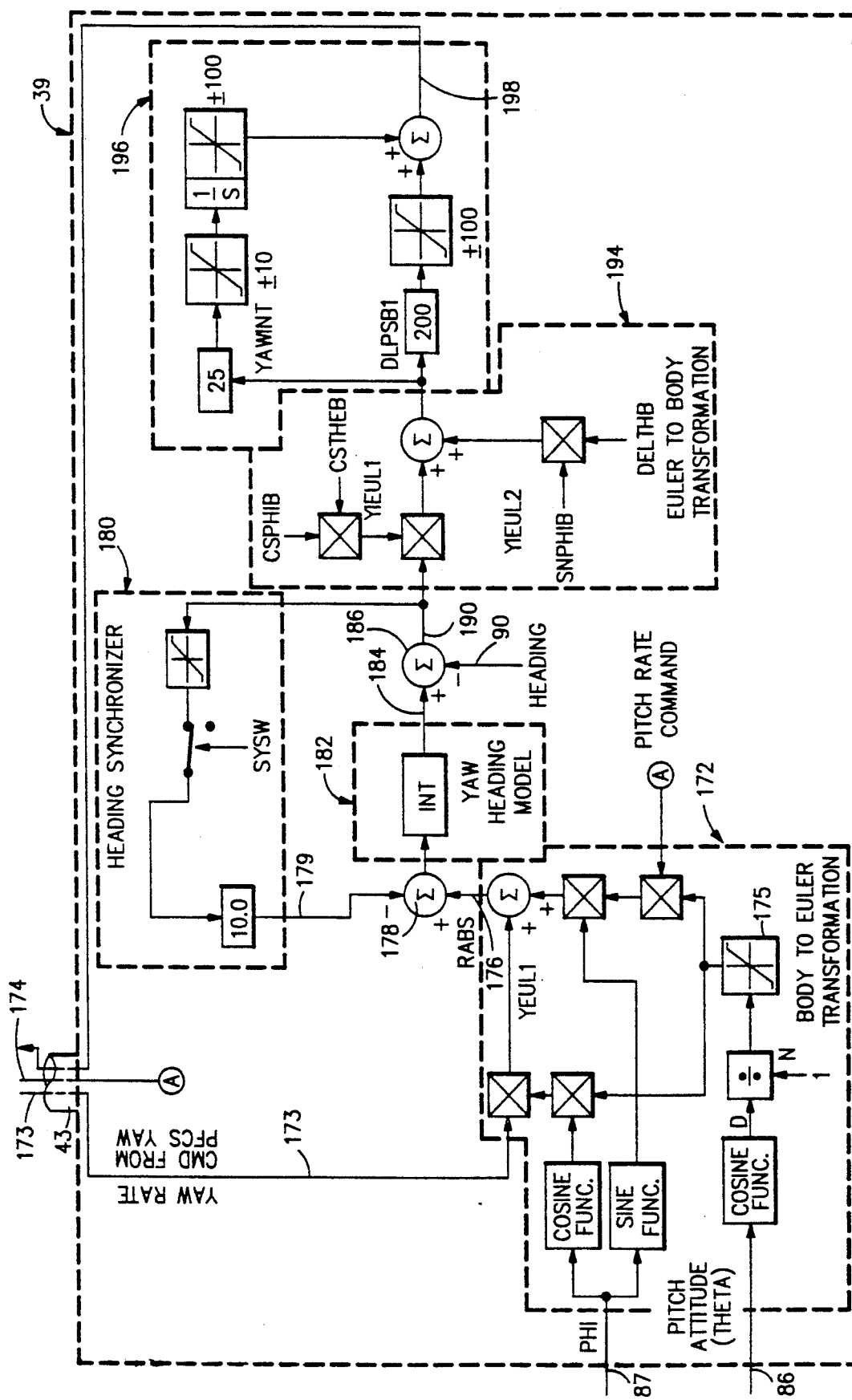
FIG. 5 is a block diagram of the aircraft yaw axes control logic resident in the AFCS of FIG. 1.

The present invention is also applicable to the AFCS yaw logic module 39, illustrated in FIG. 5. Similar to the roll logic (FIG. 4) the yaw logic module includes a Body-to-Euler transform 172 which receives a desired yaw rate command on a line 173 from the PFCS yaw logic module 35. The transform also receives the pitch rate command signal on a line 173 from the PFCS pitch logic module 36. Note, the transform contains a singularity at ±90°, which is limited by a limit function 175 to a value less than infinity. The transform 172 provides a transformed desired yaw rate command on a line 176 to a summing function 178 which also receives a heading synchronize signal on a line 179 from a heading synchronizer 180. The summing function 178 provides a difference signal to a heading attitude model 182 (i.e., an integrator) which provides a desired heading signal on a line 184. A summing function 186 computes the error between the desired heading and the actual heading signal on the line 90, and provides a heading error signal indicative of the difference between the two on a line 190.

When the pitch attitude comparison 141 (FIG. 4) sets SYSW, the heading synchronizer 180 is engaged, and provides feedback around the heading model 182, such that the heading model essentially tracks the actual heading signal on the line 90. Forcing the attitude model to track solves the hereinbefore describe problems of the the model diverging from the actual attitude at high pitch attitudes.

The yaw attitude control logic also includes a Euler-to-Body transformation 194 and a proportional and integral compensator 196, which both work in essentially the same manner as their counterparts in FIG. 4. The logic ultimately provides a Yaw AFCS command on a line 198, to the PFCS as shown at the top level in FIG. 1.

Figure 6:
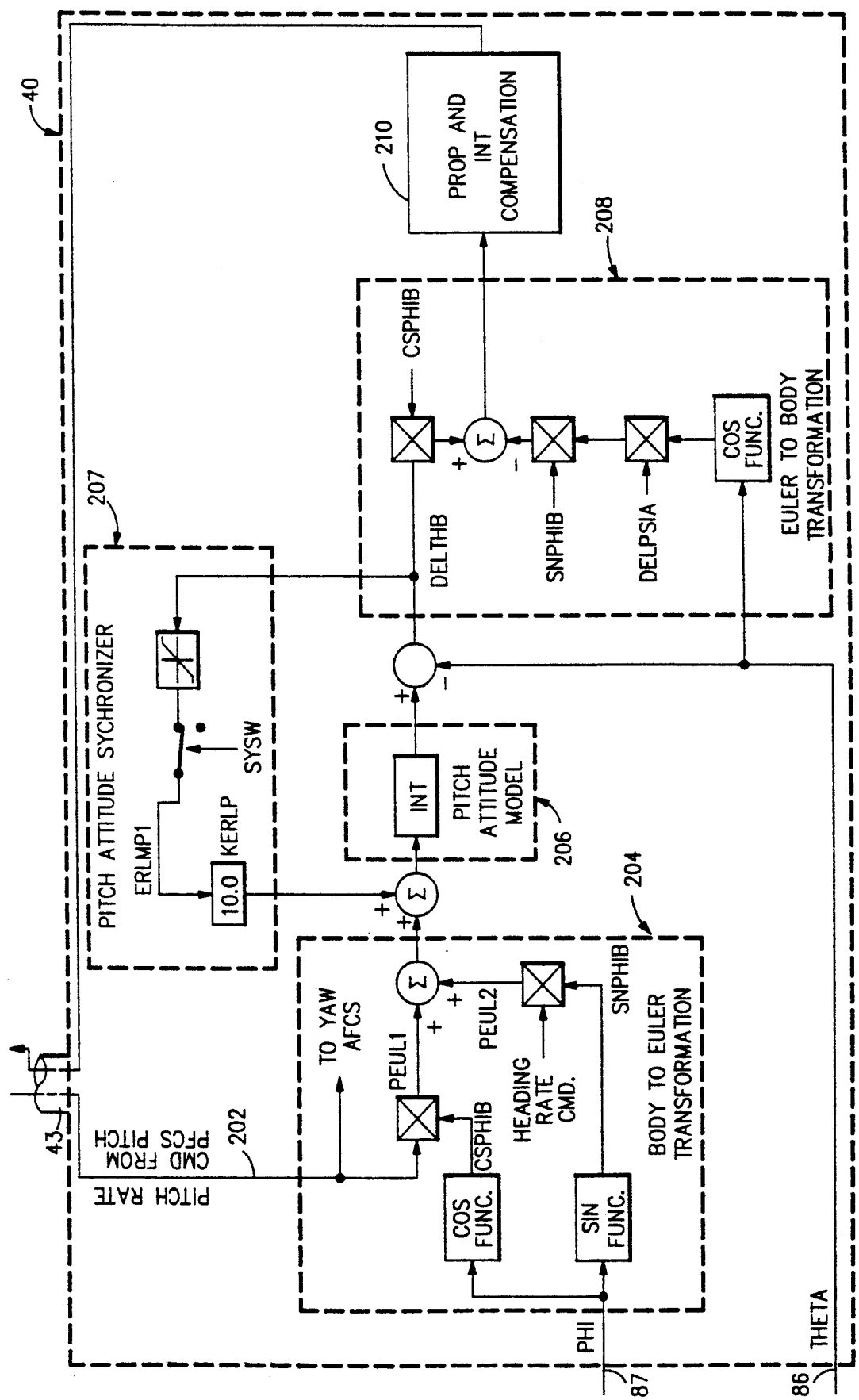
FIG. 6 is a block diagram of the aircraft pitch axis control logic resident in the AFCS of FIG. 1.

The present invention is also applicable to the pitch attitude of the aircraft. FIG. 6 illustrates the AFCS pitch logic module 40, which receives a desired pitch rate command signal on a line 202 from the PFCS pitch logic module 36. Similar to the roll and yaw logic modules illustrated in FIGS. 4 and 5 respectively, the AFCS pitch logic module 40 includes a Body-to-Euler transformation 204, an attitude model (i.e., an integrator) 206, a pitch attitude synchronizer 207, a Euler-to-Body Transformation 208, and a proportional and integral compensator 210. The operation of the AFCS pitch module is similar to the roll and yaw modules 41,39 described hereinbefore. It should be noted that no singularities exist in the pitch axis transform. However, model following control laws tend to develop large errors between the desired (commanded) response of the aircraft and the actual response at large pitch attitudes where the aircraft response is very non-linear. Therefore, under these conditions the pitch axis control logic will benefit from the attitude synchronization logic.

It should be understood the scope of this invention is not limited by the specific gains, lag filters, time constants, summing functions and limiting functions presented herein. Rather, it is contemplated in the practice of the present invention that the specific control laws are going to change based upon the dynamics of the plant to be controlled (e.g., an attack helicopter versus a commercial helicopter), and the peculiarities associated with each plant. As an example, the inverse model may be greater than first order. In addition it is not necessary that the flight control system be partitioned in a PFCS and an AFCS. Rather it is contemplated that the system may not be partitioned at all in some applications, whereas in other applications the system may be further partitioned into subsystems based on criteria such as reliability and maintainability.

Furthermore, while it is obvious it still is worth stating that the present invention is clearly not limited to a microprocessor based control system. The system may be implemented in a non-microprocessor based electronic system (either digital or analog).

Figure 7:
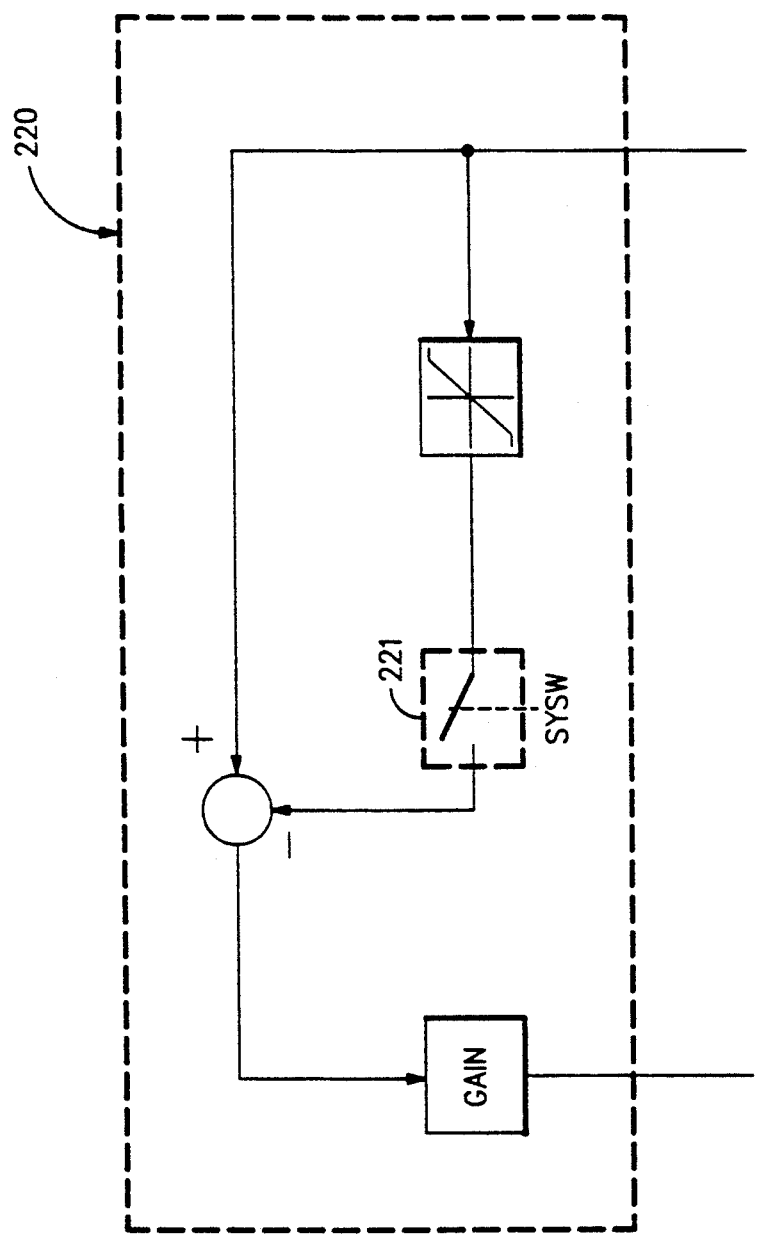
FIG. 7 is an alternative embodiment of the attitude synchronizers of FIGS. 4-6.

There are various ways the attitude model can be made to track the sensed attitude value when the pitch attitude starts to approach Euler singularities. As an example, FIG. 7 illustrates an alternative embodiment attitude synchronizer 220. In this embodiment a switch 221 is opened rather than closed when SYSW is set by the comparison function 141 (FIG. 4).

All the foregoing changes and variations are irrelevant to the invention, it suffices that a rotary wing aircraft flight control system receives inputs from a multiaxis sidearm controller, and schedules via an aircraft rate command model a set point for the aircraft pitch, roll, yaw rates of change. The set point for the rate of change about each axis is used as a reference for: (1) a rate of change feedback path; an integrated value of the set point is used for (2) an attitude feedback path having an attitude model which is driven to track a sensed value as the aircraft approaches and operates at high pitch angles, and (3) a feedforward control path having an inverse vehicle model to provide a command signal indicative of the command necessary for the aircraft to respond in a manner defined by the set point. Signals from all three paths are summed to provide a command signal which is applied to the aircraft, such that, the aircraft response about the pitch, roll and yaw axes is driven towards the set points.

By forcing the attitude model of the aircraft to track the sensed attitude about the axis it is modeling, the present invention ensures the model is never deviating from the aircraft by an unacceptable amount following an approach to, or transition through a Euler singularity. This creates a more robust aircraft response as pitch attitude is reduced since the attitude models have been forced to track their corresponding actual aircraft attitude.

Although the present invention has been shown and described with respect to a best mode embodiment thereof, it should be understood by those skilled in the art that various other changes, omissions and additions to the form and detail of the thereof, may be made therein without departing from the spirit and scope of the invention.

We claim:

1. A helicopter flight control system which receives an attitude signal indicative of the helicopter attitude, and a rate signal indicative of the helicopter's rate of change about a particular axis, comprising:

a multi-axis sidearm controller for providing an axis command signal;

rate model means responsive to said axis command signal, for providing a rate set point signal indicative of the desired rate of change about either the pitch, roll or yaw axis of the helicopter;

means for computing the difference between said rate set point and the rate signal, and for providing a rate error signal indicative thereof;

inverse model means responsive to said rate set point signal for scheduling a feedforward command signal to drive the aircraft to respond in a manner which is essentially equal to said set point signal;

means responsive to said set point signal and the attitude signal, comprising means for biasing said rate set point signal with a synchronization signal, and providing a biased signal indicative thereof;

means for integrating said biased signal to provide an attitude set point signal, for comparing said attitude set point and the attitude signal, and for providing an attitude error signal indicative of the difference;

synchronization means responsive to said attitude error signal, for selectably driving said means for integrating such that said attitude set point signal tracks the attitude signal by providing feedback around said means for integrating when the helicopter pitch attitude exceeds a certain value; and conditioning means responsive to said rate error signal, said feedforward command signal, and said attitude error signal, for providing a command signal to the helicopter main rotor.

2. A helicopter flight control system of the type having: sensors which provide sensed signal values indicative of helicopter attitude, including pitch attitude, and helicopter attitude rate of change; a sidearm controller which supplies the flight control system with an input signal value; the flight control system provides a command signal to the helicopter main rotor or tail rotor and includes provision to prevent Euler singularities which occur when the sensed pitch attitude signal value exceeds a certain threshold value, the control system comprising:

means for providing, for each value of the input signal presented thereto, a corresponding desired attitude rate of change signal;

inverse model means for providing for each value of said desire attitude rate of change signal a feedforward set point signal value indicative or a rotor command necessary for the helicopter to respond in a manner equal to said desired attitude rate of change signal value;

means for transforming each value of said desired attitude rate of change signal whose basis is with respect to the body of the helicopter, to a new value having a basis with respect to Euler inertial axes, and for providing a transformed desired attitude rate of change signal indicative of the new value;

means for integrating over time said transformed desired attitude rate of change signal value to provide a desired attitude signal value indicative of the desired attitude of the helicopter about the axis corresponding to the desired rate of change signal value;

means for computing a difference value between said desired attitude signal value and the sensed attitude signal value, and for providing an attitude error signal value indicative of the difference;

means, responsive to said attitude error signal value, for synchronizing the values of said desired attitude signal and the sensed attitude signal when the pitch attitude signal value exceeds a certain threshold value, by providing feedback of said attitude error signal value to said means for integrating which causes said desired attitude signal value to track the sensed attitude signal value when the pitch attitude signal value exceeds said certain threshold value;

means for re-transforming each value of said attitude error signal whose basis is with respect to Euler inertial axes, back to the basis with respect to the helicopter body axes, and for providing a body attitude error signal value which is indicative of the attitude error with respect to the helicopter body;

means for computing a second difference value between said desired attitude rate of change signal and the sensed attitude rate of change signal value, and for providing a rate error signal indicative of the second difference value;

means for summing said rate error signal value, said body attitude error signal value, and said feedforward set point signal value to provide the command signal as a summation thereof; and means for outputting the command signal to the helicopter rotors.

3. The system of claim 2, wherein said means for synchronizing comprises:

means for comparing the pitch attitude signal value against said certain threshold value to provide a status discrete which is true when the pitch attitude signal value is greater than or equal to said certain threshold value; and switch means, for providing said attitude error signal value to said means for integrating only when said status signal is true.

4. The system of claim 3, wherein the particular axis is the pitch, roll or yaw axis of the helicopter.

5. The system of claim 4, wherein said means for re-transforming comprises a proportional and integral compensator which provides said body attitude error signal value.

6. The system of claim 4, wherein said inverse model means includes a lead filter of at least first order which provides said feedforward set point signal value.

7. A helicopter flight control system of the type which receives from sensors, signal values indicative of: sensed rate of change about a particular helicopter axis, sensed helicopter attitude about the particular axis, and sensed pitch attitude, the control system also receives an input command signal from a sidearm controller indicative of the desired helicopter response about the particular axis; the system controls the aircraft response about the particular axis and includes provision to prevent Euler singularities due to large helicopter pitch attitudes, the control system comprising:

means for providing, for each value of the input command signal, a corresponding desired rate set point signal value indicative of the desired helicopter rate of change about the particular axis;

a feedforward path including inverse model means for providing for each desired rate set point signal value a feedforward set point signal value indicative of the command to the rotors required for the helicopter to rotate about the particular axis at a rate equal to said desired rate set point signal value;

a rate feedback path including means for computing a difference signal value indicative of the difference between said desired rate set point signal value and the sensed rate of change signal value;

an attitude feedback path comprising:

means for transforming each value of said desired rate of change signal whose basis is with respect to the body of the helicopter, to a new value having a basis with respect to Euler inertial coordinates, and for providing a transformed desired rate of change signal indicative of the transformed signal value;

means for integrating over time said summed signal value to provide a desired attitude signal value indicative of the desired attitude of the helicopter about the particular axis;

means for computing a difference value between said desired attitude signal value and the sensed attitude signal value, and for providing an attitude error signal value indicative of the difference;

synchronizer means, responsive of said attitude error signal value, for driving said means for integrating such that said attitude signal value is driven to essentially track the sensed attitude signal value when the value of the sensed pitch attitude exceeds a certain threshold value;

means for re-transforming each value of said attitude error signal whose basis is with respect to Euler inertial axes back to the basis with respect to the helicopter body axes, and for providing a body attitude error signal value which is indicative of the attitude error with respect to the helicopter body;

means, for summing the output signal from the feedforward, rate error and attitude error paths by summing said feedforward set point signal value, said rate error signal value and said attitude error signal value to provide the command signal as the sum thereof; and output means for presenting the command signal to the helicopter rotors.

8. The system of claim 7, wherein synchronizer means feeds back each value of said attitude error signal to said means for integrating when the sensed pitch attitude signal value exceeds said certain threshold value in order to drive said desired attitude signal value to essentially track the sensed attitude signal value.

9. The system of claim 8, wherein said synchronizer means includes means for comparing the pitch attitude signal value against said certain threshold value to provide a status discrete which is true when the pitch attitude signal value is greater than or equal to said certain threshold value; and switch means, for providing said attitude error signal value to said means for integrating only when said status signal is true.

10. The system of claim 9, wherein said means for re-transforming includes a proportional and integral compensator which provides said body attitude error signal.

11. The system of claim 9, wherein said inverse model means includes a lead filter which provides said feedforward set point signal value.

12. The system of claim 11, wherein the particular axis is the pitch, roll or yaw axis of the helicopter.

* * * * *